United States Patent [19]
Davida et al.

[11] 4,275,265
[45] Jun. 23, 1981

[54] COMPLETE SUBSTITUTION PERMUTATION ENCIPHERING AND DECIPHERING CIRCUIT

[75] Inventors: George I. Davida, Bethesda, Md.; John B. Kam, New York, N.Y.

[73] Assignee: Wisconsin Alumni Research Foundation, Madison, Wis.

[21] Appl. No.: 947,428

[22] Filed: Oct. 2, 1978

[51] Int. Cl.$^3$ .............................................. H04L 9/00
[52] U.S. Cl. .................................. 178/22.09; 340/348
[58] Field of Search ........................... 178/22; 340/348

[56] References Cited

U.S. PATENT DOCUMENTS

| | | | |
|---|---|---|---|
| 2,403,280 | 7/1946 | Hicks | 178/22 |
| 2,424,998 | 8/1947 | Nyquist | 178/22 |
| 2,547,515 | 4/1951 | Zenner | 178/22 |
| 2,629,012 | 2/1953 | Ehrat | 178/22 |
| 2,802,047 | 8/1957 | Hagelin | 178/22 |
| 2,984,700 | 5/1961 | Small | 178/22 |
| 3,988,538 | 10/1976 | Patten | 178/22 |
| 4,074,066 | 2/1978 | Ehrsam et al. | 178/22 |

Primary Examiner—Howard A. Birmiel
Attorney, Agent, or Firm—Howard W. Bremer; Robert W. Cook

[57] ABSTRACT

A complete substitution permutation enciphering and deciphering circuit and method for transforming a plaintext signal into an enciphered signal which is secure during transmission. After receipt, the enciphered signal is transformed back into the original plaintext signal by use of a similar circuit and method. A complete substitution permutation enciphering and deciphering circuit is constructed by interconnecting a number of substitution boxes. Each substitution box is complete, that is each binary bit of the substitution box output is dependent on all binary bits of the substitution box input for all possible combinations of input signals. When such substitution boxes are connected according to the invention, the substitution permutation enciphering and deciphering circuit formed thereby is complete in the sense that every output signal of the circuit is dependent on all input signals of the circuit.

12 Claims, 2 Drawing Figures

COMPLETE SUBSTITUTION PERMUTATION ENCIPHERING AND DECIPHERING CIRCUIT

The Government has rights in this invention pursuant to Grant No. MCS77-02156 and IPA No. 0001 awarded by the National Science Foundation.

BACKGROUND OF THE INVENTION

This invention relates to the secure transmission of digital data messages and more particularly to a complete substitution permutation circuit and method for use in a digital data enciphering and deciphering circuit.

When data is transmitted by a means that is not secure against interception it is necessary to encipher the data so that if it is intercepted, no useful information can be obtained from it. High security applications have always existed, however, recently industrial espionage has reached major proportions requiring the use of data enciphering. The current trend toward the use of renote access networks for the transmission of data, especially when these networks are carried over vulnerable commercial telephone facilities, has resulted in an increased need for data enciphering. It is possible for an interceptor to employ an expert called a cryptanalyst to break the cipher, and then decipher the intercepted data himself. As cryptanalysts have become better at breaking ciphers, aided by sohpisticated computers, more difficult ciphers have been developed in order to maintain data security. The value of any given data enciphering and deciphering technique is measured by how much effort must be expended in order to break it.

One prior art cipher method is performed by using a table with the alphabet in one column and a scrambled alphabet in another column such that for each letter there is one and only one corresponding letter. The original message which it is desired to encipher, called plaintext, is enciphered by looking each letter up in the table and changing it to the corresponding letter. The result, which is called ciphertext, is no longer meaningful to an ordinary person. The cryptanalyst can easily break this cipher, however, by taking advantage of certain information, e.g., the true identity of letters can be determined by their frequency of occurrence, since the average frequency of occurrence of each letter in the alphabet in ordinary English text is well known.

The use of substitution permutation type networks for enciphering and deciphering is now well known, for example see "Cryptography and Computer Privacy" by Horst Feistel, published in the SCIENTIFIC AMERICAN magazine of May 1973 pages 15 to 23. Substitution permutation networks consist of alternating stages of substitution boxes which perform one to one transformations on small groups of input bits and permutation stages which shuffle or permute the binary data lines. The use of alternating stages of substitution and permutation in the design of an enciphering or deciphering network results in an apparently complex and therefore potentially more secure cipher. In order to further enchance the complexity and security of the cipher it has also been taught in the prior art to use a key which is a digital signal that is often changed, for example by assigning different keys to different users in a system that has multiple users, and that is used to alter the enciphering or deciphering circuit so as to further enhance the cipher. The substitution pemutation cipher described by Feistel, as referred to above, uses the individual bits of the key to select one of two possible circuits for each of the substitution boxes used to construct the substitution stages.

Recently the National Bureau of Standards has chosen a variation of the substitution permutation scheme as the Data Encryption Standard, for example see The Federal Register, Volume 40, Number 52 of Monday March 17, 1975 pages 12134 through 12139. Since the Data Encryption Standard as described above, was proposed it has been criticized by some computer scientists as being too weak for the present level of computer technology. It has been suggested that currently available techniques would allow the cipher to be broken for any given key in an unreasonably short period of time and that the key size should be increased from the currently proposed size of 64 bits to something like 128 bits. An example of such criticism can be found in the article by Whitfield Diffie and Martin E. Helman which appeared in COMPUTER magazine of June 1977 pages 74 to 84.

If the key size is large in a substitution permutation circuit there exists a problem in that it is difficult to insure that for all possible keys the circuit which is configured by applying that key is complete. If for some keys the circuit is incomplete then some bits of the circuit outputs will be dependent only on a subset of the circuit inputs, so that in effect the circuit is a less powerful circuit than it would be expected to be. Many schemes for data encryption that intuitively appear to be complex and difficult to break have unexpected incomplete conditions. Therefore in addition to devising an intuitively complex scheme, which no one is able to prove incomplete, it is desirable to design data encryption circuits such that it can be proved that they meet certain standards, especially in terms of being complete. A data translation circuit is called complete if it implements a function such that every output bit is dependent on all input bits. To state it more formally, a complete data translation circuit is a one to one data translation circuit, i.e. every input combination is translated to one and only one output combination, and in addition satisfies the property that for each combination of one output bit and one input bit a certain input signal combination can be applied to all the input bits such that if only the signal present on the one input bits is changed then the signal present on the one output bit will change. For each combination of one output bit and one input bit that satisfy the above property it is then known that the one output bit is a function of that one input bit. If for a certain output bit the above process is successfully repeated for each input bit then that certain output bit is a function of all input bits. If each output bit is tested and determined to be a function of all input bits then the entire data translation circuit is complete.

Although all complete data translation circuits are one to one data translation circuits, not all one to one data translation circuits are complete data translation circuits. As an example consider the identity circuit, i.e. the circuit which transforms every input signal combination into the same output signal combination. The identity circuits is a one to one data translation circuit and yet it is intuitively clear that it is a terrible data enciphering circuit. In particular, the signal present on each output bit corresponds exactly to the signal present on one input bit and so each output bit is dependent on only one input bit and therefore certainly the identity circuit is incomplete. Many other one to one data transformation circuits are also incomplete, for example in a random sample of one to one data transformation circuits many output bits may be found such that the signal present thereon corresponds exactly either to the signal present on one of the input bits or the compliment thereof. All of the substitution boxes referred to in the example of this invention are complete data translation circuits. Small circuits with only a few inputs and outputs can be easily designed to be complete, for example by exhaustively testing for completeness all one to one functions with the desired number of inputs and outputs or other methods described in the detailed description which follows. It is, however, difficult to apply the same technique or other similar techniques to the design of complete data encryption circuits which have more than a small number of inputs and outputs.

It is an object of this invention to design a substitution permutation type network for enciphering and deciphering digital data by interconnecting a number of small complete circuits, such that the entire circuit is complete for any key which it is used with.

SUMMARY OF THE INVENTION

In accordance with the present invention a circuit for translating binary plaintext information into binary ciphertext information comprises a number of complete data translation circuits arranged in several rows. The first row of complete data translation circuits are connected to a number of binary inputs and the last row of complete data translation circuits are connected to a number of binary outputs. Each complete data translation circuit has a small number of inputs and outputs and can translate signals presented to the inputs into different signals at the outputs thereof. The complete data translation circuits are interconnected such that every binary output bit is dependent on all binary input bits.

BRIEF DESCRIPTION OF THE DRAWING

A complete substitution permutation enciphering and deciphering circuit according to this invention will be better understood from a consideration of the detailed description of the organization and operation of one illustrative embodiment thereof which follows when taken in conjunction with the accompanying drawing, in which.

DETAILED DESCRIPTION

Figure 1:
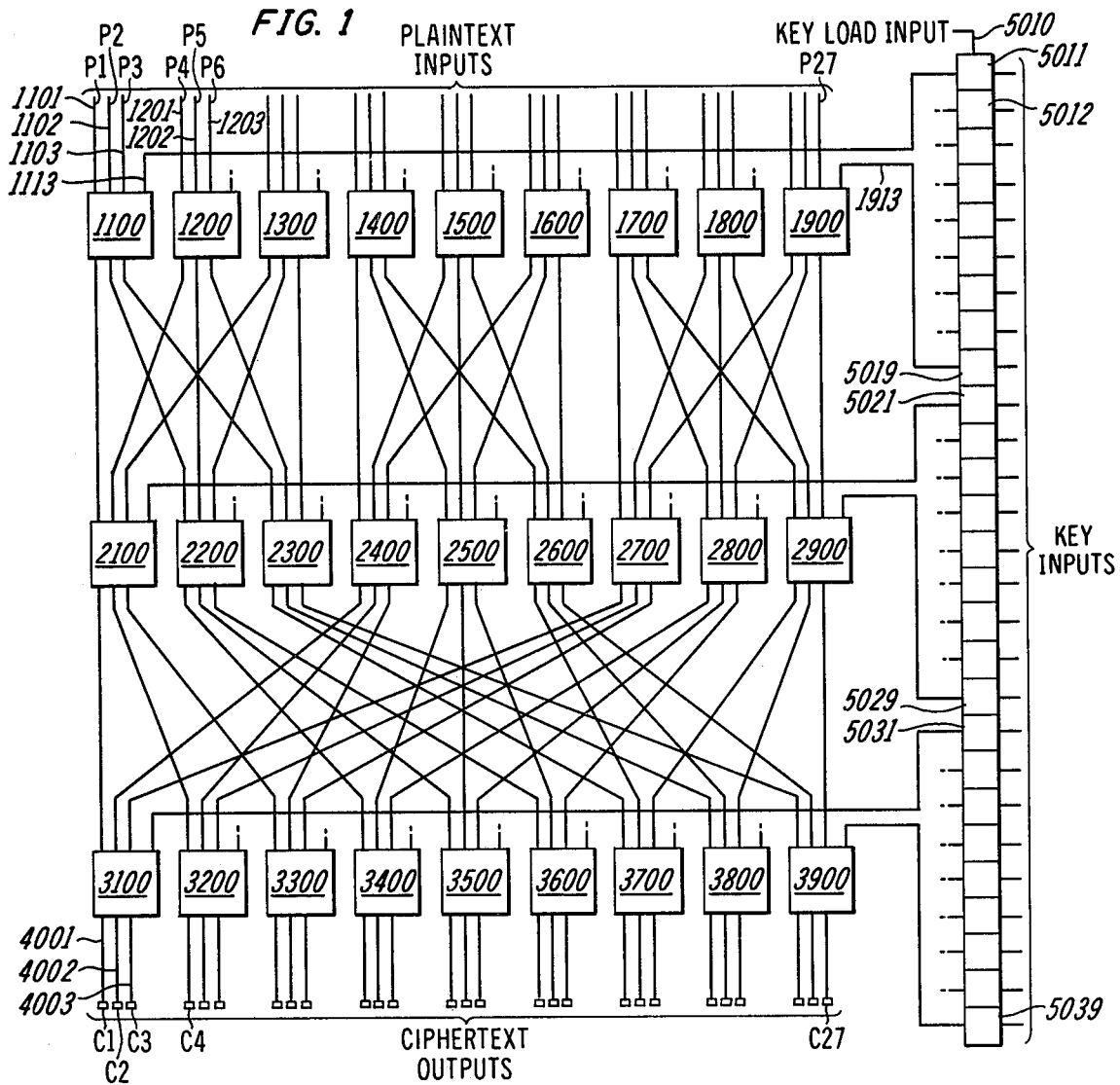
FIG. 1 depicts an exemplary substitution permutation enciphering and deciphering circuit according to the invention.

One illustrative complete substitution permutation enciphering and deciphering circuit according to the invention is shown in FIG. 1 comprising twenty seven inputs labeled P1 through P27, a key load input, twenty seven key inputs, twenty seven ciphertext outputs C1 through C27, twenty seven key register flip flops 5011 through 5019, 5021 through 5029, and 5031 through 5039, twenty seven substitution boxes 1100 through 1900 by 100's, 2100 through 2900 by 100's, and 3100 through 3900 by 100's, and a number of interconnections between the already listed elements as will be further described in the following. The first three plaintext inputs, P1, P2 and P3 are connected to the first three corresponding inputs of substitution box 1100 by means of conductors 1101, 1102 and 1103 respectively. The second set of three plaintext inputs, P4, P5 and P6 are connected to the first three corresponding inputs of substitution box 1200 by means of conductors 1201, 1202 and 1203 respectively. The remaining plaintext inputs are similarly connected to the inputs of substitution boxes 1300 through 1900 in groups of threes. The key input of substitution box 1100 is connected to the output of the first key register flip flop 5011 by means of a conductor 1113. The remaining key inputs of substitution boxes 1200 through 3900 are similarly connected to the key register flip flop outputs 5012 through 5019, 5021 though 5029, and 5031 through 5039. The inputs to the key register flip flops 5011 through 5039 are connected to the twenty seven key inputs in order. The substitution boxes 1100 through 1900 form the first row or first stage of the complete substitution permutation enciphering and deciphering circuit according to this invention. The second stage comprises substitution boxes 2100 through 2900 and the third stage comprises substitution boxes 3100 through 3900. The interconnections between the second stage of substitution boxes and the first stage of substitution boxes as well as the interconnections between the third stage of substitution boxes and the second stage of substitution boxes will be described later in this detailed description. The ciphertext outputs C1, C2 and C3 are connected to the three corresponding outputs of substitution box 3100 by means of conductors 4001, 4002 and 4003 respectively. The remaining ciphertext outputs C4 through C27 are similarly connected to the outputs of substitution boxes 3200 through 3900 in groups of threes.

Figure 2:
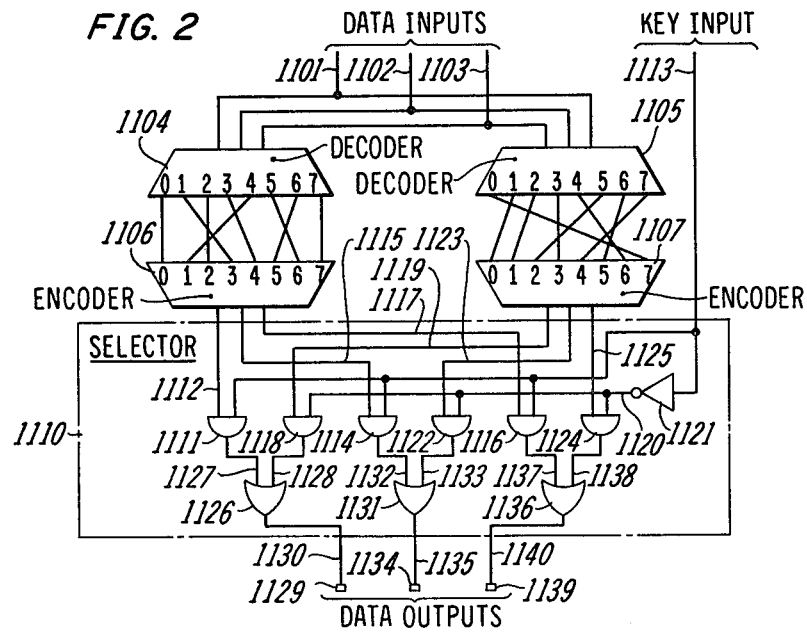
FIG. 2 depicts an exemplary substitution box for use in the circuit of FIG. 1.

One example of a substitution box according to the invention is shown in FIG. 2. The example of FIG. 2 comprises three binary data inputs and three binary data outputs. The circuit shown translates the data input signal to a different data output signal depending on the state of the key input. The data inputs are connected to the three input bits of a first decoder 1104 and a second decoder 1105 in parallel by means of three conductors 1101, 1102 and 1103. Decoders are well known in the prior art and perform the function of activating one and only one of the outputs thereof according to the particular combination of input signals present on the inputs thereof. For binary signals there are two raised to the power of the number of input bits, different combinations of possible input signals and therefore two raised to the power of the number of input bits, output bits. In the example shown in FIG. 2 there are three input bits and therefore eight output bits. It should be noted that as the number of input bits increases the number of output bits increase exponentially so that while in different implementations of this invention the substitution boxes used may have different numbers of input bits, it is not practical to increase the number of input bits beyond a small number for example four to six.

An encoder performs the opposite function as a decoder. One and only one input of an encoder is active at any given time and each input when active generates a unique combination of signals on the output bits of the encoder. The number of outputs of an encoder bears the same relationship to the number of inputs of the encoder as the number of inputs of a decoder bears to the number of outputs thereof. By connecting a decoder and encoder in the manner shown in FIG. 2 it is possible to transform each different decoder input signal combination to any desired decoder output signal combination. The different possible combinations of interconnections between the outputs of the decoder and the inputs of the encoder determine exactly what transformations of decoder inputs to encoder outputs will take place.

It is necessary to connect the decoder outputs to encoder inputs such that the data translation circuit constructed thereby is not only a one to one data translation circuit but is also a complete data translation circuit. Two systematic methods of constructing decoder encoder connections such that the corresponding data translation circuit is complete are described herein. These methods are satisfactory for the construction of data translation circuits or substitution boxes with a low number of inputs.

The first method is to systematically generate all sets of connections corresponding to one to one data translation circuits and then test each one for completeness until a complete one is found. A decoder such as decoder 1104 shown in FIG. 2 has one output corresponding to each possible input signal combination, labeled from 0 to 7 in order to represent in decimal notation the binary input signal corresponding thereto. The encoder 1106 has one input corresponding to each possible output signal combination, the inputs being labeled 0 to 7 as for the decoder 1104. If each decoder output is connected to one and only one encoder input then the combination of the decoder, encoder and associated connections will comprise a one to one data translation circuit. The generation of all one to one data translation circuits is therefore a matter of generating all possible sets of connections between the decoder outputs and the encoder inputs, which if there are n such decoder outputs and encoder inputs, is the same as generating all permutations of n things taken n at a time, the number of such permutations is well known to be n factorial. In the example of FIG. 2 there are 8 such decoder outputs and encoder inputs and therefore 8 factorial or 40,320 different possible one to one data translation circuits with 3 inputs and 3 outputs.

In order to determine whether or not a certain one to one data translation circuit is complete, construct a table with all possible input signal combinations in a first column and the corresponding output signal combinations in a second column. For example the following table corresponds to the decoder 1104, encoder 1106 and the interconnections shown in FIG. 2.

| DECODER INPUT | ENCODER OUTPUT |
| --- | --- |
| 000 | 000 |
| 001 | 011 |
| 010 | 010 |
| 011 | 100 |
| 100 | 001 |
| 101 | 110 |
| 110 | 101 |
| 111 | 111 |

The test which must now be applied is whether or not for each combination of one input bit, i.e. one column of the decoder input section, and one output bit, i.e. one column of the encoder output section, a certain input signal combination, i.e. a row of the decoder input section, can be found such that if only the input bit coincident between the selcted column and row of the decoder input section is changed then the output bit in the selected encoder output column corresponding to the originally selected row is different from the bit corresponding to the newly selected row according to the single bit change described above. There are a number of pairs of rows to test, and if any one such pair satisfies the test then proceed to the next combination of one decoder input bit and one decoder output bit until either all such combinations meet the test and are exhausted, in which case the circuit is complete, or until the test fails for some decoder input bit, encoder output bit combination in which case the circuit is not complete and the test fails. The two circuits corresponding to decoder 1104, encoder 1106 and decoder 1105, encoder 1107 are both complete and were constructed by randomly constructing one to one data translation circuits and then testing for completeness.

Another method of constructing complete data translation circuits is to construct a table as before of decoder inputs and corresponding encoder outputs but leave all the encoder output entries blank. Now proceed through the same testing procedure, however if at any step in the test there are no entries in the encoder output section of the table which will satisfy the test and there are blank entries then fill the blank entries in with entries which will satisfy the test and will make the circuit a one to one data translation circuit, i.e. no two rows have the same entry. When all tests have been satisfied then fill in any remaining blank entries such that the circuit will be a one to one data translation circuit.

Finally, another method of constructing complete data translation circuits is to first construct a number of three input complete data translation circuits. Two such circuits are shown in FIG. 2. Using the three input circuits construct circuits with the desired number of inputs by using the procedure which follows and then use the circuits thus constructed as substitution boxes in order to construct the final complete data enciphering and deciphering circuit. This method is really a departure from the method of constructing substitution boxes using decoder encoder circuits however it is a possible alternative method.

Usually a practical data enciphering and deciphering circuit requires a relatively large number of binary inputs and outputs and so the technique of connecting decoder and encoder circuits as described is not by itself a practical way to construct such a circuit because of the difficulty and complexity of constructing a decoder encoder circuit for a large number of input and output bits as described above. It is therefore necessary to combine a number of substitution boxes in the manner described above with reference to FIG. 1 and as will be further described below.

A second encoder 1107 has its inputs connected to the outputs of decoder 1105 in the same manner as the inputs of encoder 1106 are connected to the outputs of decoder 1104, except that the particular choice of connections corresponding to a particular complete function must be different than the connections between the inputs of encoder 1106 and the outputs of decoder 1104.

A selector circuit 1110 is provided to perform the function of selecting either the outputs of encoder 1106 or the outputs of encoder 1107 to be connected to the output terminals of the entire substitution box shown in FIG. 2 as determined by the state of the signal applied to the key input. The first output of encoder 1106 is connected to a first input of an AND gate 1111 by means of a conductor 1112. The second input of AND gate 1111 is connected to the key input by means of a conductor 1113. The second output of encoder 1106 is connected to a first input of an AND gate 1114 by means of a conductor 1115. The second input of AND gate 1114 is connected to the key input by means of the conductor 1113. The third output of encoder 1106 is connected to a first input of an AND gate 1116 by means of a conductor 1117. A second input of AND gate 1116 is connected to the key input by means of the conductor 1113. The first output of encoder 1107 is connected to a first input of an AND gate 1118 by means of a conductor 1119. A second input of AND gate 1118 is connected to an output of a NOT gate 1121 by means of a conductor 1120. The single input of NOT gate 1121 is connected to the key input by means of the conductor 1113. The second output of encoder 1107 is connected to a first input of an AND gate 1122 by means of a conductor 1123. A second input of AND gate 1122 is connected to the output of NOT gate 1121 by means of conductor 1120. The third output of encoder 1107 is connected to a first input of an AND gate 1124 by means of a conductor 1125. A second input of AND gate 1124 is connected to the output of NOT gate 1121 by means of conductor 1120. AND gates 1111, 1114 and 1116 are activated by one signal present on the key input, namely a binary "1" and AND gates 1118, 1122 and 1124 are activated by the opposite signal present on the key input, namely a binary "0".

The output of AND gate 1111 is connected to a first input of an OR gate 1126 by means of a conductor 1127, the output of AND gate 1118 is connected to a second input of OR gate 1126 by means of a conductor 1128 and the output of OR gate 1126 is connected to a first output terminal 1129 by means of a conductor 1130. The function of OR gate 1126 is to combine the two signals presented by AND gates 1111 and 1118 such that which ever one is active according to the signal present on the key input will be applied to the first output terminal 1129. The output of AND gate 1114 is connected to a first input of an OR gate 1131 by means of a conductor 1132, the output of AND gate 1122 is connected to a second input of OR gate 1131 by means of a conductor 1133 and the output of OR gate 1131 is connected to a second output terminal 1134 by means of a conductor 1135. The output of AND gate 1116 is connected to a first input of an OR gate 1136 by means of a conductor 1137, the output of AND gate 1124 is connected to a second input of OR gate 1136 by means of a conductor 1138 and the output of OR gate 1136 is connected to a third output terminal 1139 by means of a conductor 1140.

It is now appropriate to discuss the design philosophy for a complete substitution permutation enciphering and deciphering circuit such as the example described herein. The primary independent characteristic that is determined by external considerations is the number of binary bits in the plaintext input. For purposes of expressing certain mathematical relationships we will refer to the number of binary bits in the plaintext input as "n". The number of bits in the ciphertext output is also "n" for circuits designed according to this invention. A number of substitution boxes are required in order to implement a given cipher. The number of substitution boxes is dependent upon the number of input and output bits "n" and the number of input bits for each substitution box. The number of input bits for each substitution box is free to be chosen by the designer, however it will usually be determined by the availability of certain standard substitution box circuits. Once the number of input bits for each substitution box which we will refer to as "k", has been chosen then it is easy to determine the number of substitution boxes required for the first row or stage by simply dividing "n" by "k". If the number "n/k" is not an integer then it is simply necessary to pick the next higher integer as the appropriate number of substitution boxes in the first stage. In that case there will be some unused inputs on one of the substitution boxes, however since it is not possible to split up a substitution box this is the best way to handle the problem. For purposes of this example an integral value of "n/k" has been chosen, namely twenty seven divided by three or nine substitution boxes, however it should be apparent that the invention applies also to non integral values of "n/k". Once the number of substitution boxes in the first stage has been determined then it can also be stated that the same number of substitution boxes will be required for each subsequent stage, however it must be determined how many stages there will be. The number of stages necessary, which will be referred to as "l", can be determined by calculating the logarithm to the base "k" of "n". This relationship can be derived from the alternate expression that "n" is equal to "k" raised to the "l" power or "k" multiplied by itself "l" times. If the interconnections between the different stages as shown for example in FIG. 1 are observed it can be seen that starting from the last stage and progressing to the first stage each output becomes dependent on "k" ("k" is three in this example) times as many inputs for each stage as it is followed back through successive stages. Since we need to have each output dependent on all "n" inputs we must have "l" stages such that "k" multiplied by itself "l" times is equal to "n". If the logarithm to the base "k" of "n" is not an integer then the next larger integer must be chosen for the value of "l". If it is necessary to choose the next larger integer then there will be excess capacity provided, but again this is unavoidable since a stage can not be partially equipped. In this example the calculation yields an integral number of stages, namely the logarithm base three of twenty seven or three stages. The total number of substitution boxes required can be determined by simply multiplying the number of substitution boxes per stage, nine in this example, by the number of stages, three in this example, to yield twenty seven total substitution boxes required in this example.

Once the general structure has been determined it is necessary to precisely specify how the interconnections between the substitution boxes of different stages are to be made. Assuming that it has been determined how many inputs there are to the enciphering circuit, how many inputs there are to each substitution box, how many substitution boxes there are per stage, the number of stages and the total number of substitution boxes required for the entire enciphering circuit then proceed in the following fashion. First arrange the substitution boxes in stages, for example see the arrangement of a total of twenty seven substitution boxes into a first, second and third stage each containing nine substitution boxes as shown in FIG. 1. Next connect the enciphering circuit inputs to the inputs of the substitution boxes in the first stage in any desired order. Connect the outputs of the last stage to the enciphering circuit outputs in any desired order.

It is necessary to be able to trace a path from each output of the entire enciphering circuit through a number of substitution boxes to each different enciphering circuit input. Considering each enciphering circuit output individually, the path from such output to each different enciphering circuit input through the substitution boxes comprising the enciphering circuit forms a tree type of network. All of the substitution boxes in the last stage, i.e. the stage which is connected directly to the enciphering circuit output, will be called a single output group. All of the substitution boxes in the last stage, which form the one output group just mentioned, will be divided into a number of subgroups, the number of subgroups being the same as the number of inputs per substitution box. For each subgroup the collection of inputs to all substitution boxes in that subgroup will be referred to as an input group and the collection of outputs from all substitution boxes in that subgroup will be referred to as an output subgroup. For the next to last stage of substitution boxes, define a number of output groups, where each output group corresponds to an input group immediately below it in the following stage, e.g. the final stage in this case. This process of definition of output groups, input groups and output subgroups in each stage proceeds in this manner until the first stage is reached.

It is now necessary to connect the inputs comprising each input group to one certain output from the previous stage such that each input to the input group is connected to an output from a different output group in the previous stage. In the following paragraph the connections between each stage and the next stage will be defined more precisely. The stages are labeled from the first, which is connected to the enciphering circuit inputs, through the last, which is connected to the enciphering circuit outputs. The groups and subgroups within a stage are numbered from left to right.

The inputs of each substitution box in each stage, except the first stage, are connected to the outputs of the substitution boxes in the previous stage in the following manner:

Do the following from here to the END for each stage from the second to the last:

Do the following from here to the END for each output group of this stage from the first to the last:

Do the following from here to the END for each output subgroup of this output group from the first (i=1) output subgroup to the last (i=k, where k is the number of inputs to a substitution box) output subgroup:

Connect the outputs from the i th output subgroup of the previous stage in order from the first to the last of such outputs to the i th inputs of successive substitution boxes in the corresponding input groups of the current stage.

END.

It has been assumed in the foregoing that a key signal of the required length which is equal to the total number of substitution boxes used to construct a certain complete substitution permutation enciphering and deciphering circuit, can be supplied to the enciphering or deciphering circuit during the operation thereof. If the length of the key which is available is either shorter or longer than the length of the required key signal then the following alternative methods should be used. If the length of the available key is shorter than the length of the required key then the bits of the available key should be connected to more than one of the input bits of the required key until all the input bits of the required key have one of the bits of the available key connected thereto.

If the length of the available key is longer than the length of the required key then the first group of bits of the available key, the number of which is equal to the number of bits in the required key, are applied to the required key inputs just as previously. The remaining available key bits may be utilized by connecting each such remaining available key bit to one input of an EXCLUSIVE OR gate, connecting the output of any substitution box in the enciphering or deciphering circuit to a second input of the EXCLUSIVE OR gate and connecting all conductors previously connected to that substitution box output to the EXCLUSIVE OR gate output. Such EXCLUSIVE OR combinations of a key signal with a complete data enciphering and deciphering circuit do not effect the completeness property of the circuit and do allow the additional key signal bits to further complicate and therefore enhance the cipher.

An illustrative operation of the complete substitution permutation enciphering circuit may now be considered. The operation of the complete substitution permutation enciphering circuit according to the example described herein begins with the application of a key signal to the key input thereof. The key input is, as the name implies, necessary to be known and usd at both the enciphering and the deciphering ends in order to correctly transmit a message. Once the key input is applied then the key load input is activated, thereby gating the key input into the key register flip flops 5011 through 5039. The key just gated in to the key register will now remain active until another key is gated into the key register by the same process. Next the first plaintext input is aplied to the plaintext inputs and then a certain period of delay time is allowed to transpire. After the appropriate delay which is necessary to allow the plaintext input signal to be translated to the ciphertext output through logical gates, each of which requires a certain short delay time for a signal to propagate from the input thereof to the output thereof, the ciphertext output signal is used by whatever circuit is connected to the ciphertext output. If there are more plaintext inputs to be enciphered then the next one is applied to the plaintext input and the process continues as above until all plaintext inputs have been enciphered.

A deciphering operation is conducted in the same manner, but it is necessary to use a similar but different circuit to perform the deciphering operation. For any given enciphering circuit the corresponding deciphering circuit may be constructed by using the inverse circuit as follows: firs the input terminals are used as output terminals and the output terminals as input terminals and then each substitution box is replaced with the inverse of that particular substitution box which is a substitution box such that if any output signal present at the output of the original substitution box is applied to the input of the inverse substitution box then the signal present at the output of the inverse substitution box is the same as the signal present at the input of the original substitution box. The inverse substitution box is connected in the same place as the corresponding original substitution box except that the inputs of the inverse substitution box are connected where the outputs of the original substitution box were connected and the outputs of the inverse substitution box are connected where the inputs of the original substitution box were connected. The key register of the deciphering circuit is connected the same as the key register of the enciphering circuit was connected. Once the deciphering circuit is constructed it is operated in the same manner as the enciphering circuit except of course that the ciphertext is now applied to the input of the deciphering circuit and the output of the deciphering circuit is the corresponding plaintext.

What has been described is considered to be only a specific illustrative embodiment of the invention and it is to be understood that various other arrangements may be devised by one skilled in the art without departing from the spirit and scope thereof as defined by the accompanying claims.

We claim:

1. A circuit for translating binary plaintext information into binary ciphertext information corresponding thereto comprising:

a certain number of binary data inputs;

a corresponding number of binary data outputs;

a certain number of complete data translation circuits each comprising: a certain number of binary data inputs k to said complete data translation circuit, a certain number of binary data outputs k from said complete data translation circuit, and means for translating each possible input signal present on said binary data inputs to said complete data translation circuit into one and only one output signal present on said binary data outputs from said complete data translation circuit such that for every possible pair of numbers i and j where both i and j are between one and k there exist at least two input signal combinations and two corresponding output signal combinations such that the two input signal combinations differ from each other only in the i th bit and the two corresponding output signal combinations differ from each other in at least the j th bit; and a plurality of connections between said binary data inputs, said binary data outputs and said complete data translation circuits such that each of said binary data outputs is dependent on all of said binary data inputs.

2. The circuit as defined in claim 1, wherein each of said certain number of complete data translation circuits comprises two or more different complete data translation circuits one of which is selected for use at any certain time according to the signal present on a key input.

3. The circuit as defined in claim 2 wherein a certain number of additional key signals are combined by means of EXCLUSIVE OR gates with certain outputs of certain of said complete data translation circuits.

4. A digital data enciphering and deciphering circuit comprising:

a plurality of binary data inputs;

a plurality of binary data outputs; and a plurality of complete data translation circuits each comprising: a certain number of binary data inputs k to said complete data translation circuit, a certain number of binary data outputs k from said complete data translation circuit, and means for translating each possible input signal present on said binary data inputs to said complete data translation circuit into one and only one output signal present on said binary data outputs from said complete data translation circuit such that for every possible pair of numbers i and j, where both i and j are between one and k there exist at least two input signal combinations and two corresponding output signal combinations such that the two input signal combinations differ from each other only in the i th bit and the two corresponding output signal combinations differ from each other in at least the j th bit, said complete data translation circuits arranged in a certain predetermined number of rows and interconnected in a certain predetermined manner such that each of said plurality of binary data outputs can be traced back through certain of said plurality of complete data translation circuits to each of said plurality of binary data inputs.

5. The circuit as defined in claim 4, wherein each of said plurality of complete data translation circuits comprises two or more different complete data translation circuits one of which is selected for use at any certain time according to the signal present on a key input.

6. The circuit as defined in claim 5 wherein a certain number of additional key signals are combined by means of EXCLUSIVE OR gates with certain outputs of certain of said complete data translation circuits.

7. A method for multiple level enciphernent of a data block consisting of binary digits, said process comprising the steps of:

arranging a stream of binary digit data into a plurality of data segments;

loading each of said plurality of data segments into one of a plurality of complete data translation circuits each comprising a certain number of binary data inputs k to said complete data translation circuit, a certain number of binary data outputs k from said complete data translation circuit, and means for translating each possible input signal present on said binary data inputs to said complete data translation circuit into one and only one output signal present on said binary data outputs from said complete data translation circuit such that for every possible pair of numbers i and j, where both i and j are between one and k there exist at least two input signal combinations and two corresponding output siganl combinations such that the two input signal combinations differ from each other only in the i th bit and the two corresponding output signal combinations differ from each other in at least the j th bit, said plurality of complete data translation circuits forming a first level of said plurality of complete data translation circuits;

loading each output data bit of said first level of said complete data translation circuits into one input data bit of one of said plurality of complete data translation circuits forming a second level of said plurality of complete data translation circuits;

sequentially loading each output data bit of each level of said complete data translation circuit into certain input data bits of the successive level of said plurality of complete data translation circuits until a last level of said plurality of complete data translation circuits is loaded such that each output data bit of each complete data translation circuit of said last level of said plurality of complete data translation circuits can be traced back to all bits of said stream of binary digit data.

8. The method as defined in claim 7, wherein each of said plurality of complete data translation circuits comprises two or more different complete data translation circuits one of which is selected for use at any certain time according to the signal present on a key input.

9. The method as defined in claim 8, further comprising the step of combining a certain number of additional key signals with the outputs of certain of said complete data translation circuits, by means of a certain number of EXCLUSIVE OR gates.

10. A method for constructing a digital data enciphering and deciphering circuit from a number of substitution boxes, each substitution box comprising k input terminals, k output terminals, and means for translating each possible input signal combination present on said k input terminals to one and only one output signal combination present on said k output terminals, such that for every possible pair of numbers i and j where both i and j are between one and k there exist two input signal combinations and two corresponding output signal combinations such that the two input signal combinations differ from each other only in the i th bit and the two corresponding output signal combinations differ from each other in at least the j th bit, comprising the steps of:

constructing a certain number n of input terminals;

constructing a certain number n of output terminals;

arranging a number of substitution boxes in a first stage of substitution boxes, said number of substitution boxes being equal to the smallest integer equal to or greater than n divided by k;

arranging a number of subsequent stages of substitution boxes each comprising the same number of substitution boxes that said first stage of substitution boxes comprises, said number of subsequent stages of substitution boxes being equal to the smallest integer equal to or greater than the logarithm to the base k of n, minus one;

connecting said n input terminals to said k input terminals of said substitution boxes in said first stage of substitution boxes;

connecting said n output terminals to said k output terminals of the last of said subsequent substitution boxes;

defining a set of output sub groups in said first stage of substitution boxes such that each substitution box in said first stage of substitution boxes comprises an output sub group;

defining an input group in the last of said subsequent stages of substitution boxes such that said input group of said last stage of substitution boxes comprise all substitution boxes in said last stage of substitution boxes;

defining a set of input groups in each of said subsequent stages of substitution boxes except said first and said last stages of substitution boxes, comprising the substitution boxes corresponding, in the sense of being in the same column, to the same numbered output group in the preceeding stage;

defining a set of output sub groups in each of said subsequent stages of substitution boxes except said first and said last stages of substitution boxes, comprising the substitution boxes in the same numbered input group of the same stage;

defining a set of output groups in each of said subsequent stages of substitution boxes except said first and said last stages of substitution boxes, comprising k output sub groups from the same stage;

performing all of the subsequent steps once for each stage of substitution boxes from the second to the last;

performing all of the subsequent steps once for each output group of the stage determined by the previous step;

performing all of the subsequent steps once for each output sub group of the output group determined by the previous step from the first output subgroup (i=1) to the last output subgroup (i=k;) and connecting the k output terminals of each substitution box in the i th output subgroup of the previous stage in order from the first to the last of such outputs to the i th inputs of successive substitution boxes in the corresponding input groups of the current stage.

11. The method as defined in claim 10, wherein each of said substitution boxes comprises two or more different substitution boxes, one of which is selected for use at any certain time according to the signal present on a key input.

12. The method as defined in claim 11, further comprising the step of combining a certain number of additional key signals with the outputs of certain of said complete data translation circuits, by means of a certain number of EXCLUSIVE OR gates.

* * * * *